(12) United States Patent  (10) Patent No.: US 7,698,185 B2
Hofer et al.  (45) Date of Patent: Apr. 13, 2010

(54) METHODS AND SYSTEMS FOR GENERATING DYNAMIC REWARD CURRENCY VALUES

(75) Inventors: Dominic Hofer, Erlenbach (CH); Bruno M Frieden, Erlenbach (CH)

(73) Assignee: Loylogic, Inc., Zurich-Kuesnacht (CH)

( * ) Notice: Subject to any disclaimer, the term of this patent is extended or adjusted under 35 U.S.C. 154(b) by 1008 days.

(21) Appl. No.: 11/117,225

(22) Filed: Apr. 28, 2005

(65) Prior Publication Data

US 2006/0248007 A1 Nov. 2, 2006

(51) Int. Cl.
G06Q 40/00 (2006.01)
(52) U.S. Cl. ....................................................... 705/35
(58) Field of Classification Search ........................ None
See application file for complete search history.

(56) References Cited

U.S. PATENT DOCUMENTS

| 4,968,873 | A | * | 11/1990 | Dethloff et al. | 235/380 |
|---|---|---|---|---|---|
| 5,025,372 | A | | 6/1991 | Burton et al. | 364/406 |
| 5,202,826 | A | | 4/1993 | McCarthy | 705/14 |
| 5,774,870 | A | | 6/1998 | Storey | 705/14 |
| 5,923,016 | A | | 7/1999 | Freregill et al. | 705/14 |
| 6,061,660 | A | * | 5/2000 | Eggleston et al. | 705/14 |
| 6,138,911 | A | | 10/2000 | Fredregill et al. | 705/14 |
| 6,829,586 | B2 | | 12/2004 | Postrel | 705/14 |
| 2002/0002532 | A1 | * | 1/2002 | Tso | 705/39 |
| 2002/0087406 | A1 | | 7/2002 | Hashimoto et al. | |
| 2006/0053052 | A1 | * | 3/2006 | Baggett et al. | 705/14 |
| 2006/0053053 | A1 | * | 3/2006 | Baggett et al. | 705/14 |
| 2006/0053054 | A1 | * | 3/2006 | Baggett et al. | 705/14 |
| 2006/0053055 | A1 | * | 3/2006 | Baggett et al. | 705/14 |

FOREIGN PATENT DOCUMENTS

| EP | 0 949 596 | * | 10/1999 |
| GB | 2 319 381 | * | 5/1998 |
| WO | WO 97/48078 | * | 12/1997 |
| WO | WO 00/31685 | * | 6/2000 |

OTHER PUBLICATIONS

McGoo, William J., "New Frequent Flyers", Leisure Travel News, Jul. 27, 1998, p. 6.*
International Search Report dated Aug. 18, 2008, PCT Application No. PCT/US06/14731 (4 pages).

* cited by examiner

*Primary Examiner*—Olabode Akintola
(74) *Attorney, Agent, or Firm*—Merchant & Gould P.C.

(57) ABSTRACT

Systems and methods are disclosed for generating payment values of goods and services (rewards). The disclosed systems and methods may include receiving an input. Furthermore, the disclosed systems and methods may include dynamic calculating, based upon the received input, a plurality of payment pairs, each of the plurality of payment pairs comprising any (including a plurality of) non-monetary currency value and/or any monetary currency value (between 0% and 100% respectively 100% and 0%).

27 Claims, 7 Drawing Sheets

METHODS AND SYSTEMS FOR GENERATING DYNAMIC REWARD CURRENCY VALUES

BACKGROUND OF THE INVENTION

1. Field of the Invention

The present invention generally relates to methods and systems for generating dynamic values for non-monetary reward currency that has varying values depending upon the type of goods and services for which the non-monetary reward currency is being redeemed and the amount of monetary currency being used in combination with non-monetary reward currency to make a purchase. More particularly, the present invention relates to determining payment and/or exchange values of goods and services offered as rewards in a loyalty, motivation or similar reward program comprising a plurality of dynamic combinations of non-monetary reward currency and monetary currency.

2. Background Information

To attract, retain and direct customers, employees and partners, an enterprise may provide a loyalty, motivation or similar reward program. In driving certain behavior, the program sponsoring enterprise distributes a non-monetary currency (e.g., points, miles or other) as an incentive to the program participants for achieving certain predefined objectives. The non-monetary currency distributed to the program participants as a reward can be redeemed by the program participants to purchase specific goods and services designated by the program sponsoring enterprise. For example, an airline's frequent flyer program provides non-monetary currency in the form of frequent flyer miles to customers participating in the frequent flyer program. The customer may redeem any accrued frequent flyer miles for free flights, upgrades or other rewards designated by the program sponsor. In some situations, customers may not have enough miles to redeem for a desired reward. For example, a customer may have enough accrued miles to redeem toward the purchase of a good or service, but the customer may not currently have accrued enough miles for the reward they desire the most. The conventional strategy is to statically limit the goods and services reward choices of a customer to the goods and services that their current mileage account balance may afford. This often causes problems because the conventional strategy does not permit a customer to self-determine any desired combination of a non-monetary currency and a monetary currency to redeem for a desired good or service.

In view of the foregoing, there is a need for methods and systems for determining payment values of goods and services more optimally. Furthermore, there is a need for customer determined payment values of goods and services comprising any combinations of non-monetary currency values and/or monetary currency values.

To finance the rewards, reward program sponsors back up their non-monetary currency (program liability). Therefore every program sponsor attributes a backup value per non-monetary currency unit issued (e.g., US$0.01). Such backup values per non-monetary currency unit vary heavily among programs and typically depend on an enterprise's cost structure and/or general margin as well as an industry's competitive environment. For example, airline frequent flyer programs offer free seats for flights or upgrades as rewards. For such free seats, airlines only back up the variable cost. Since the airline industry's cost structure generates high fixed and low variable cost, the cost of such free seats are minimal compared to other programs. For example, if the participant of a frequent flyer program redeems 20,000 miles to purchase a flight having an average retail value of $400, the variable cost to the frequent flyer program might be around $50. Due to the great value for both airlines and customers, frequent flyer programs world-wide have been very successful. However, it has also led to a world wide frequent flyer program mileage liability of over 14 trillion miles by the end of 2004, making frequent flyer miles the biggest currency in the world. As a consequence, airlines face pressure on free seat availability while customers face devaluation of their mileage currency. In some situations, airlines offer non-flight rewards (products or services) to provide their customers alternative rewards. However, such alternative rewards are usually low-value mileage redemption opportunities. For example, an airline may offer a box of chocolates for 20,000 miles as a non-flight reward to its frequent flyer program participants. While the cost to the frequent flyer program facilitator is $50 for both the box of chocolates or the flight, the retail value to a customer for these two rewards differs substantially. The retail value to the program participant for a flight is $400 as compared to the $55 retail value for the box of chocolates.

In view of the foregoing, there is a need for methods and systems for determining payment values of goods and services more optimally. Furthermore, there is a need for a reward currency system and method that provides an equivalent incentive for reward program participants to use the reward currency for the purchase of any items on the program sponsors list of goods and services. Such a system, if used in combination with an airline frequent flyer program would remove, for example, the disincentive from using the non-monetary currency for goods and services other than the purchase of airline flights.

SUMMARY OF THE INVENTION

Consistent with embodiments of the present invention, systems and methods are disclosed for generating dynamic values for non-monetary currency wherein the value of the non-monetary currency is dependent upon the goods or services being purchased and the amount of monetary currency being used in combination with the non-monetary currency in purchasing such goods and service.

In accordance with one embodiment, a method for determining a non-monetary currency value comprises receiving an input and calculating, based upon the received input, at least one payment pair, wherein the at least one payment pair is comprised of at least a non-monetary currency component value.

According to another embodiment, a system for determining a non-monetary currency value comprises a memory storage for maintaining a database and a processing unit coupled to the memory storage, wherein the processing unit is operative to receive an input and calculate, based upon the received input, at least one payment pair, wherein the at least one payment pair comprises at least a non-monetary currency value.

In accordance with yet another embodiment, a computer-readable medium which stores a set of instructions which when executed performs a method for determining a non-monetary currency value, the method executed by the set of instructions comprising receiving an input and calculating, based upon the received input, at least one payment pair, wherein at least one payment pair comprises a non-monetary currency component.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description and include systems and methods for determining the required monetary currency value, given a non-monetary currency payment value to determine the overall price of a good or service for a currency/non-currency payment combination.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1A:
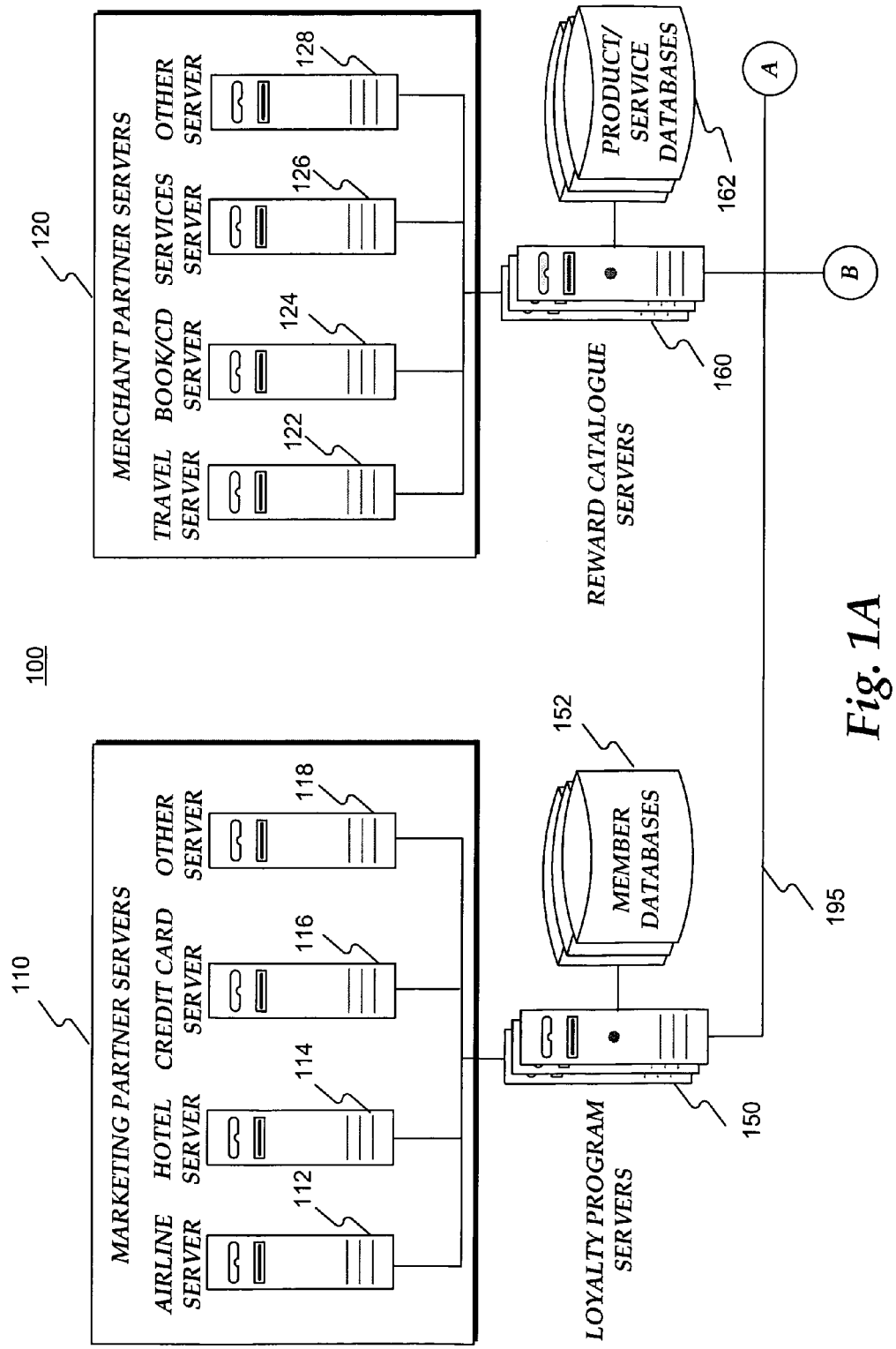
FIG. 1A and FIG. 1B is a block diagram of an exemplary system for generating a dynamic non-monetary reward currency consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

Systems and methods consistent with embodiments of the present invention may be used to generate a dynamic aspect to the value associated with non-monetary reward currency utilized in reward programs. In a reward program, a user may earn or otherwise receive non-monetary currency that may be used to redeem a reward. The non-monetary currency may comprise, but is not limited to, general rewards points, airline frequent flyer miles, or other non-monetary reward currency associated with financial or non-financial accounts. The non-monetary currency may be associated with or otherwise related to loyalty reward programs (for example, directed toward consumers), motivation programs (for example, directed towards employees or distributors), or any other program that may leverage a non-monetary currency valuation process. The aforementioned are exemplary and the non-monetary currency may comprise other non-monetary qualities.

Once a non-monetary reward currency is received, the user may wish to redeem an award with the non-monetary currency for products, services, or a combination of products and services selected, for example, by the user. Consistent with embodiments of the invention, in conjunction with redeeming non-monetary currency for example, a software implemented process that is driven by an algorithm may be used to calculate currency values needed to purchase a selected good or service. In one embodiment, identifying and inputting either a monetary currency or non-monetary currency amount, results in the generation of a specific payment pair comprised of the currency component input and a corresponding non-monetary component or vice versa. In another embodiment, the calculated currency values may comprise a plurality of payment pairs each comprising, for example, a non-monetary currency component and a monetary currency component. The monetary currency component may comprise a cash amount and may relate to, for example, any known monetary currency. For each payment pair, the combination of the non-monetary and monetary components may correspond to the selected good or service's cost to the reward program member. Furthermore, typically no two non-monetary currency component values within the plurality of payment pairs may be the same. Likewise, typically no two monetary currency component values within the plurality of payment pairs may be the same. Moreover, the value of the non-monetary currency component multiplied by a corresponding currency value plus the monetary currency component value may be equal to the cost value of an item desired to be purchased.

When the user wishes to redeem non-monetary currency for a selected good or service, the present invention provides the user with an option of using non-monetary currency only, non-monetary currency in combination with monetary currency or monetary currency alone. When the user desires to use a combination of monetary and non-monetary currency, the user may determine the amount of monetary currency that shall be used in combination with non-monetary currency to purchase an item. The user inputs the desired amount of monetary currency into the system via the system's currency values software module. Upon input of the monetary currency, the currency values software module presents a payment pair comprised of a non-monetary currency component and the monetary currency component input. The non-monetary currency component is generated by the currency values software module in direct response to the monetary currency amount input. The payment pair presented to the user may be accepted or rejected. If the payment pair is rejected, the user is provided with an opportunity to modify either of the monetary or non-monetary currency components of the payment pair, which shall generate an alternate payment pair comprising different monetary and non-monetary currency components values.

As an alternative, if the user is not aware of the amount of monetary currency they would like to use and also does not have enough non-monetary currency to purchase a desired item, the user may input an amount less than the required level of non-monetary currency into the system to purchase an item. Upon the input of the non-monetary currency amount, the currency values software module generates a payment pair comprised of the non-monetary currency amount input and a generated monetary currency amount. It is to be understood that the currency values software module is flexible and is not limited to a specific number of payment pairs. Payment pairs are generated based on the input values of the monetary or non-monetary currency amounts. Consequently, the user may choose any point along, for example, a monetary currency and non-monetary currency continuum as a preferred method of paying for the selected good or service. Once the user generates a unique payment pair or selects one of a plurality of possible payment pairs, a financial account associated with the user, for example, may be debited with an amount equal to the monetary currency value associated with the user selected payment pair. Likewise, a rewards currency account associated with the user, for example, may be debited with an amount equal to the non-monetary currency value associated with the user generated or selected payment pair.

The aforementioned algorithm within the currency values software module may use as few or as many parameters as desired. Moreover, the algorithm may assign more value, for example, to the value of each incremental unit of non-monetary currency (e.g., each point) the greater the monetary currency value within a respective payment pair. For example, a system user desires to redeem non-monetary currency for goods or services. In this example, the item to be purchased has a retail value of $100, and four potential payment pairs are discussed. The first payment pair may have a 20,000 unit non-monetary currency component and a $0 monetary currency component. The second payment pair, for example, may have a 9,000 unit non-monetary currency component and a $50 monetary currency component. The third payment pair, for example, may have a 1,000 unit non-monetary component value and a $90 monetary currency component. The fourth payment pair may, for example, may have a 0 unit non-monetary component value and a $100 monetary currency component value. In accordance with the above example, each unit of the 20,000 units of non-monetary currency in the first payment pair's non-monetary currency component may be given a $0.0050 value. Because the second and third payment pair's monetary currency component values are greater than the first payment pair's monetary currency component value, each incremental unit in the second and third payment pair's non-monetary currency component may be given values of $0.0055 and $0.0100 respectively. The non-monetary currency component value in both the second and third payment pairs are greater than each incremental unit in the first payment pair's non-monetary currency value. Accordingly, because the reward program member is provided the freedom to choose their desired payment strategy, and thereby generates a personalized payment pair, they are also offered the fourth payment pair where they could pay in monetary currency only and, for example, accrue 2points for each dollar spent instead of redeeming points.

Embodiments of the invention may be practiced within existing loyalty and reward program systems with the user interfacing with the existing program systems. Other embodiments of the invention may be practiced in a separate system connected to existing loyalty and reward program systems with the user interfacing with the separate system. It is also contemplated that the invention may be used in combination with any payment processing system, so long as the merchant store or website through which purchases are made has a relationship with the non-monetary currency facilitator. In such an environment, the holder of non-monetary currency would be able to use non-monetary currency in combination with monetary currency to purchase items at a retail outlet or website to purchase items for sale. The software module that implements the dynamic nature of generating payment options consisting of monetary and non-monetary components is implemented in combination with retail outlet point of sale systems or retail outlet virtual sales stores on a web site having items for sale. The present embodiment of the present invention operates in a non-loyalty retailer or merchant environment in the same manner it does for a reward program. The distinction between non-loyalty and reward environments is that in a non-loyalty environment, the non-monetary currency facilitator must agree to exchange money for the non-monetary currency when the non-monetary currency is redeemed for items purchased at a merchant retail outlet or website.

An embodiment consistent with the invention may comprise a system for determining payment values. The system may comprise a memory storage for maintaining a database and a processing unit coupled to the memory storage. The processing unit may be operative to receive an input. Furthermore, the processing unit may be operative to calculate, based upon the received input, a specific payment pair driven by the input component or a plurality of payment pairs, wherein each payment pair comprises a non-monetary currency component and a monetary currency component.

Figure 1B:
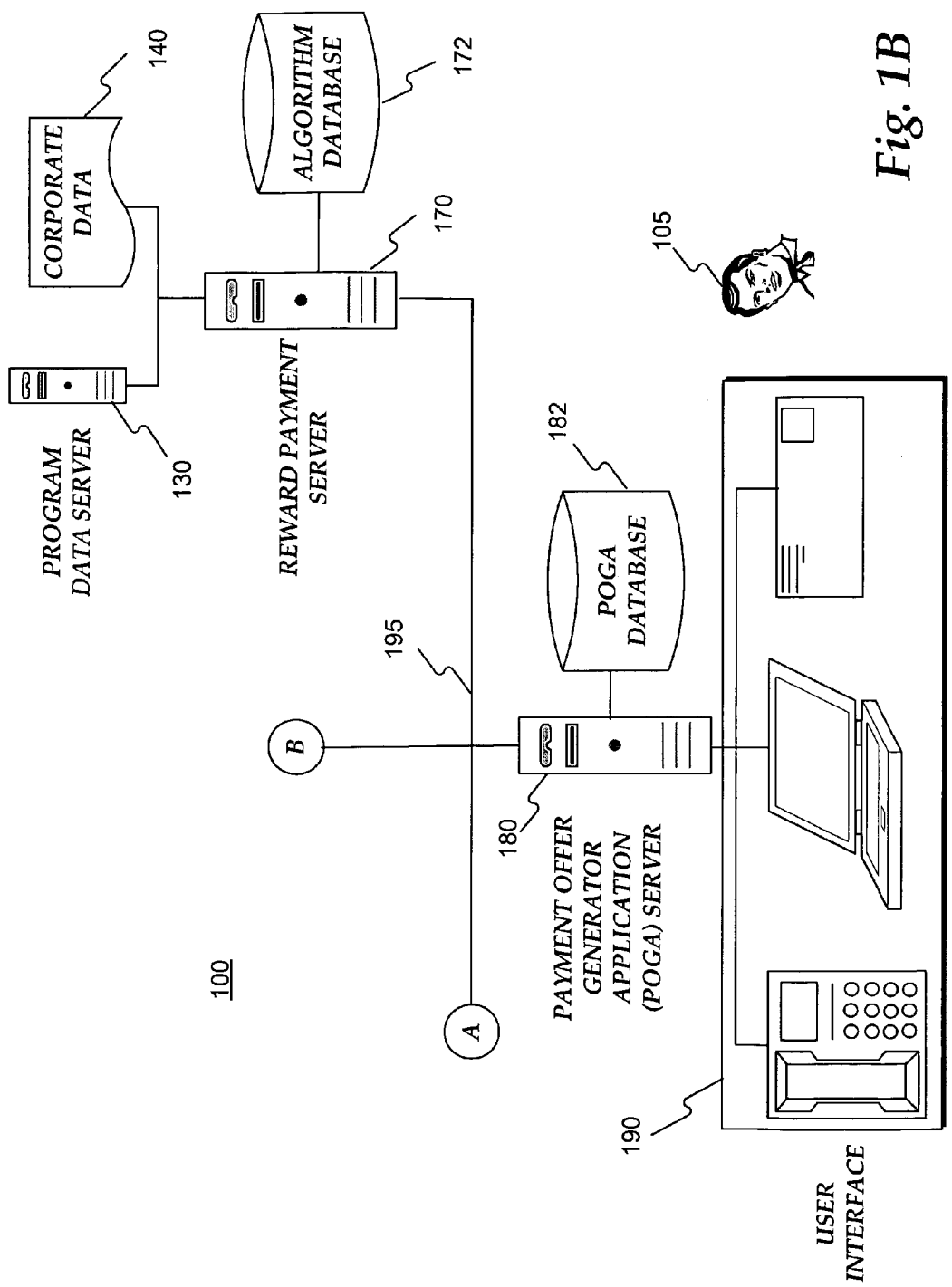

Consistent with an embodiment of the present invention, the aforementioned memory, processing unit, and other components may be implemented in a dynamic currency payment determining system, such as an exemplary dynamic currency payment determining system 100 of FIG. 1A and FIG. 1B. Any suitable combination of hardware, software, and/or firmware may be used to implement the memory, processing unit, or other components. By way of example, the memory, processing unit, or other components may be implemented with any server shown in FIG. 1A and FIG. 1B, including, for example, a payment offer generator application (POGA) server 180, in combination with system 100. The aforementioned system and server are exemplary and other systems and servers may comprise the aforementioned memory, processing unit, or other components, consistent with embodiments of the present invention.

By way of a non-limiting example, FIG. 1A and FIG. 1B illustrate system 100 in which the features and principles of the present invention may be implemented. As illustrated in the block diagram of FIG. 1A and FIG. 1B, system 100 may include a user 105, marketing partner servers 110, merchant partner servers 120, a program data server 130, a corporate database 140, reward program servers 150, reward catalogue servers 160, a reward payment server 170, a POGA server 180, a user interface 190, and a network 195. User 105 may be an individual, for example, desiring to use system 100 to redeem non-monetary currency by generating a specific payment pair for the item desired to be purchased or by selecting from one of a plurality of payment pairs generated by the processing unit, wherein each payment pair generated comprises a non-monetary currency component and monetary currency component. User 105 may also be an organization, enterprise, or any other entity having such desires.

POGA server 180 may include a processing unit and memory. The memory may include a currency values software module and a currency values database. The currency values software module residing in the memory may be executed on the processing unit, may access the currency values database, and may implement processes in conjunction with a payment offer generator application executing a dynamic currency value algorithm, an example of which is described below with respect to FIG. 3A and FIG. 3B. Notwithstanding, POGA server 180 may execute other software modules and implement other processes. Furthermore, in another embodiment, a processing unit and memory similar to that described above with respect to POGA server 180 may reside in any server shown in FIG. 1A and FIG. 1B and may implement processes in conjunction with determining payment values such as the method described below with respect to FIG. 3A and FIG. 3B.

As shown in FIG. 1A and FIG. 1B, marketing partners servers 110 may comprise, for example, an airline server 112, a hotel server 114, a credit card server 116, and another marketing server 118. Marketing partners of a reward program, operating respective servers, may buy reward currency (e.g., points, miles) to provide customers incentives to purchase, for example, their products or services. Marketing partners may report non-monetary currency accruals and redemptions, promotions, and other relevant information.

Merchant partners servers 120 may comprise, for example, a travel server 122, a book/CD server 124, a services server 126, and another merchant server 128. Merchants (i.e., reward suppliers), operating respective servers, may sell to reward programs (or deliver upon the program sponsor's order) directly to program members. They may appear under the program's brand or under their own brand. Many forms of integration may be possible. Suppliers may deliver products (e.g., books, travel, software, games) as well as services (e.g., banking, investment, tax advisory, legal). The aforementioned are exemplary, and other types of merchants, products, and services may be offered.

Program server 130 may provide reward program financial data such as currency conversion rates or program rules such as minimum currency redemption per reward, limits, as well as other program preferences or dedicated requests. Such inputs may be used in the dynamic currency value algorithm, an example of which is described in detail below with respect to FIG. 3A and FIG. 3B. Furthermore, corporate database 140 may include data from a reward payment provider/licensee such as desired product or service margins or other pertinent information to a given reward program. Reward program servers 150 may access member databases 152 and represent one or multiple (i.e., consolidated into single currency) reward programs (e.g., airline, hotel, car rental, retail, consortium, etc.) offering programs based on their own (not necessarily proprietary) infrastructure and rules (i.e., terms and conditions.)

Still referring to FIG. 1A and FIG. 1B, reward catalogue servers 160 accessing product/service databases 162, may facilitate in directly supplying rewards from the reward program sponsor (e.g., airlines supply seats on their flights.) Alternatively, the reward program may cooperate with specialized reward catalogue providers (e.g., American Express Incentive Services) to provide rewards to members. The core competence of reward catalogue providers may be to buy (large volumes), stock, ship, and handle rewards, for example, in the name, and on behalf of, a reward program sponsor.

Reward payment server 170 may consolidate input data that enables a reward payment calculation that may produce a specific payment pair for the item desired to be purchased or a plurality of payment pairs each comprising a non-monetary currency component and a monetary currency component. For example, each payment pair may comprise a cash and/or non-monetary currency component pair of any denomination, based on a flexible non-monetary currency face value that depends on the cash component combined with the non-monetary currency as the means for payment. Algorithms generating reward payment calculations may be different depending upon a reward program and may be tailored to a particular reward program and the reward program sponsor's needs, constraints, and objectives, for example.

POGA 180 may gather information from various sources and generate the reward offer for user 105. As stated above, the reward offer may comprise a specific payment pair generated based on the input data. Alternatively, POGA 180 may present a plurality of payment pairs, each of the plurality of payment pairs comprising, for example, a non-monetary currency component and a monetary currency component. Furthermore, POGA 180 may gather information and generate the reward offer as described below with respect to FIG. 3A and FIG. 3B. User interface 190 may use web channels (e.g., computer, cable), mobile channels (e.g., mobile phone, PDA), phone channels (e.g., call center, etc.), print channels (e.g., newsletters, catalogues, etc.) or any other interface technology. The aforementioned interfaces are exemplary and others may be used in conjunction with system 100.

Figure 2:
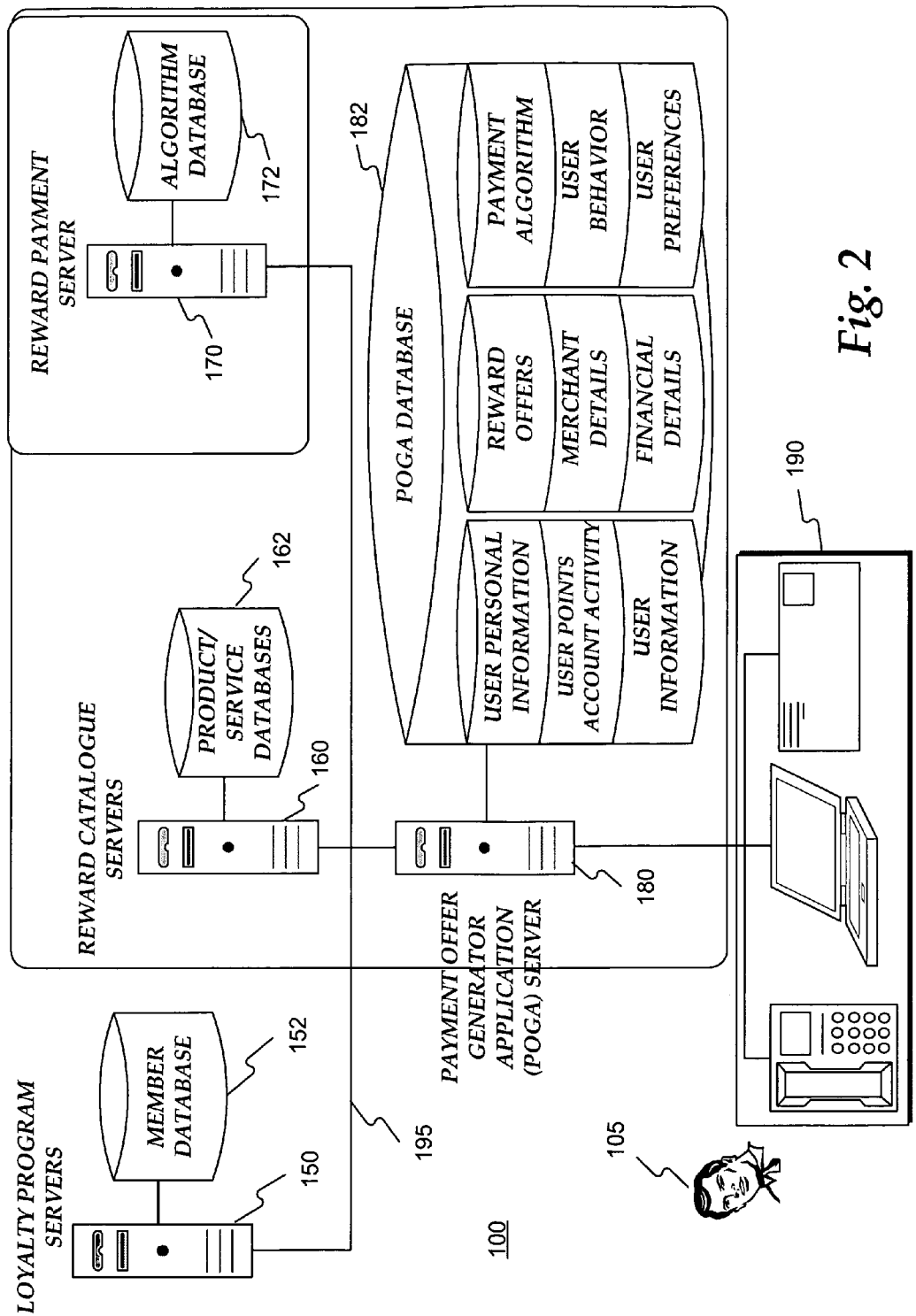
FIG. 2 is a block diagram of the exemplary system for generating a dynamic non-monetary reward currency of FIG. 1A and FIG. 1B shown in more detail consistent with an embodiment of the present invention.

FIG. 2 shows system 100 in more detail. As shown in FIG. 2, the payment offer generator application running on POGA 180 may gather the following exemplary type of information from various sources and may generate the reward offer (e.g. including at least one of a plurality of potential payment pairs) for user 105: i) user personal information (e.g., name, address, etc.); ii) user non-monetary currency account activity (e.g., current balance, accumulation rate, etc.); iii) reward program member insights (e.g., elite level, reward preferences, etc.); iv) reward program information (e.g., rules, terms and conditions, etc.); v) merchant product/service offerings (e.g., product/service, item description, item picture, etc.); vi) merchant details (e.g., shipping countries, shipping prices, conversion deals, special services, etc.); and vii) reward program dedicated payment algorithm(s). As illustrated in FIG. 1A, FIG. 1B, and FIG. 2, the payment offer generator application running on POGA 180 may comprise a separate application that may run on a dedicated server. The payment offer generator application may also run, for example, on any server shown in FIG. 1A, FIG. 1B, and FIG. 2 or on user interface 190. Moreover, instead of developing a separate database for the payment offer generator application, real-time data transfer may be received from reward program server 150, reward catalogue server 160, and reward payment server 170. Such data transfers may be established, for example, using Internet data exchange technologies such as XML or equivalent technologies. The aforementioned exchange technologies are exemplary, and others may be used.

POGA database 182 may include data sets that are pertinent to the payment offer generator application. The data sets in POGA database 182 may comprise a combination of imported data from other servers shown in FIG. 1A, FIG. 1B, and FIG. 2 and data generated and/or enriched through the payment offer generator application. The files shown in POGA database 182 in FIG. 2 are illustrative and other files may be used.

The design and appearance alternatives for user interface 190 may be developed according to, for example, the reward program sponsor needs. The designs and appearance may include, but are not limited to a program's proprietary reward shop design comprising the look and feel (i.e., corporate identity) of the program sponsor's company or program (e.g., Lufthansa Worldshop) or a reward provider's proprietary reward shop. Moreover, user interface 190 may be designed to directly enhance the payment methods of any proprietary online retailer (e.g., Amazon may offer a points payment method based on this application.) Furthermore, user interface 190 may also be developed as a reward portal where user 105 may select the participating program and currency, logs in and shops for rewards from the offered reward selection in a meta-branded reward shop. The consolidation of several reward programs into one single reward currency (pool of points and/or miles) may also be supported.

Any of the servers in FIG. 1A, FIG. 1B, and FIG. 2, including POGA server 180, ("the servers") included in system 100 may be implemented using a personal computer, network computer, mainframe, or other similar microcomputer-based workstation. The servers may comprise any type of computer operating environment, such as hand-held devices, multiprocessor systems, microprocessor-based or programmable sender electronic devices, minicomputers, mainframe computers, and the like. The servers may also be practiced in distributed computing environments where tasks are performed by remote processing devices. Furthermore, any of the servers may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, or a facsimile machine. The aforementioned systems and devices are exemplary and the servers may comprise other systems or devices.

Network 195 may comprise, for example, a local area network (LAN) or a wide area network (WAN). Such networking environments are commonplace in offices, enterprise-wide computer networks, intranets, and the Internet. When a LAN is used as network 195, a network interface located at any of the servers may be used to interconnect any of the servers. When network 195 is implemented in a WAN networking environment, such as the Internet, the servers may typically include an internal or external modem (not shown) or other means for establishing communications over the WAN. Further, in utilizing network 195, data sent over network 195 may be encrypted to insure data security by using known encryption/decryption techniques.

In addition to utilizing a wire line communications system as network 195, a wireless communications system, or a combination of wire line and wireless may be utilized as network 195 in order to, for example, exchange web pages via the Internet, exchange e-mails via the Internet, or for utilizing other communications channels. Wireless can be defined as radio transmission via the airwaves. However, it may be appreciated that various other communication techniques can be used to provide wireless transmission, including infrared line of sight, cellular, microwave, satellite, packet radio, and spread spectrum radio. The servers in the wireless environment can be any mobile terminal, such as the mobile terminals described above. Wireless data may include, but is not limited to, paging, text messaging, e-mail, Internet access, and other specialized data applications specifically excluding or including voice transmission.

System 100 may also transmit data by methods and processes other than, or in combination with, network 195. These methods and processes may include, but are not limited to, transferring data via, diskette, CD ROM, facsimile, flash memory sticks, conventional mail, an interactive voice response system (IVR), or via voice over a publicly switched telephone network.

Furthermore, the invention may be practiced in an electrical circuit comprising discrete electronic elements, packaged or integrated electronic chips containing logic gates, a circuit utilizing a microprocessor, or on a single chip containing electronic elements or microprocessors. The invention may also be practiced using other technologies capable of performing logical operations such as, for example, AND, OR, and NOT, including but not limited to mechanical, optical, fluidic, and quantum technologies. In addition, the invention may be practiced within a general-purpose computer or in any other circuits or systems.

Figure 3A:
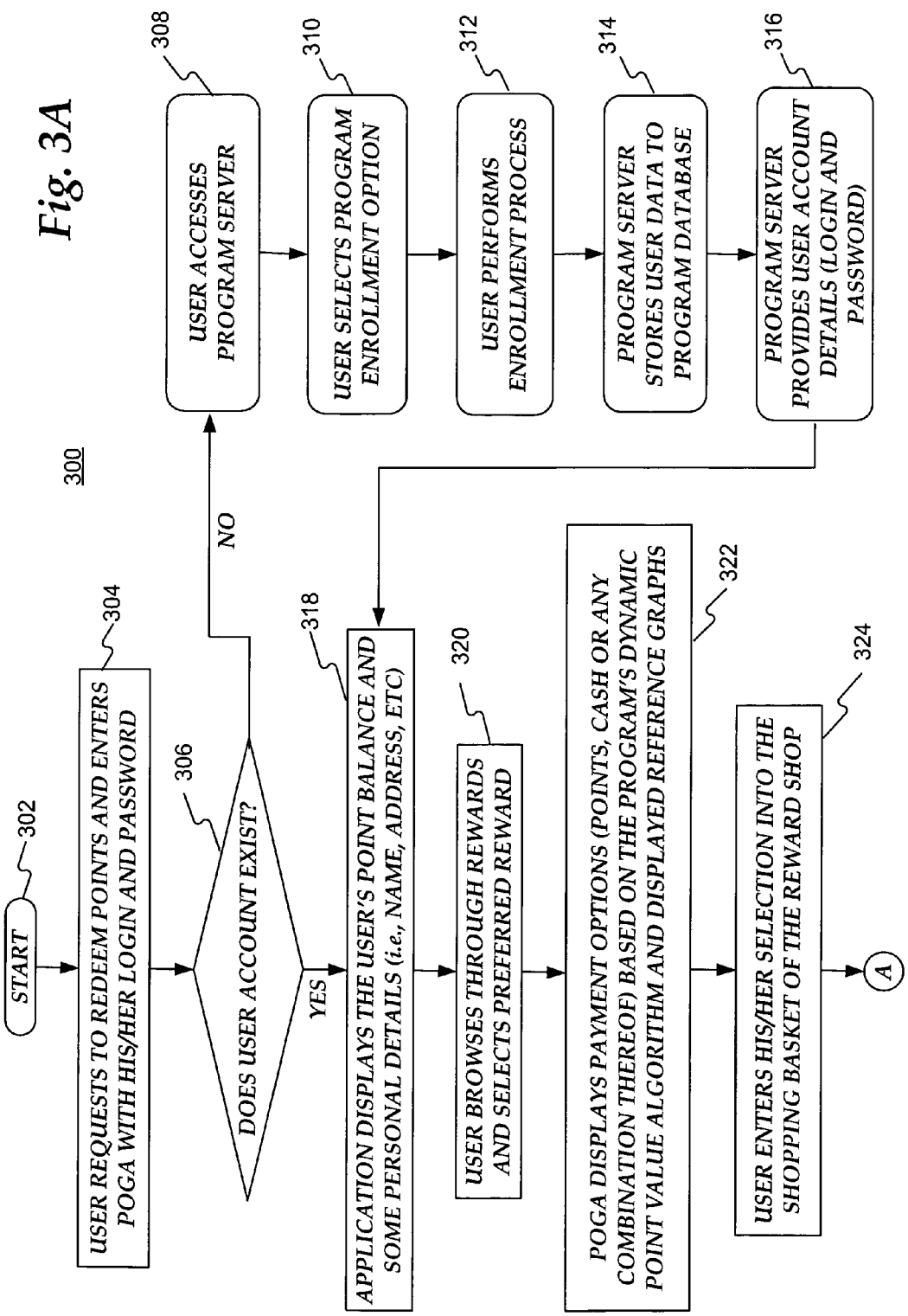
FIG. 3A and FIG. 3B is a flow chart of an exemplary method for generating a dynamic non-monetary reward currency consistent with an embodiment of the present invention.
Figure 3B:
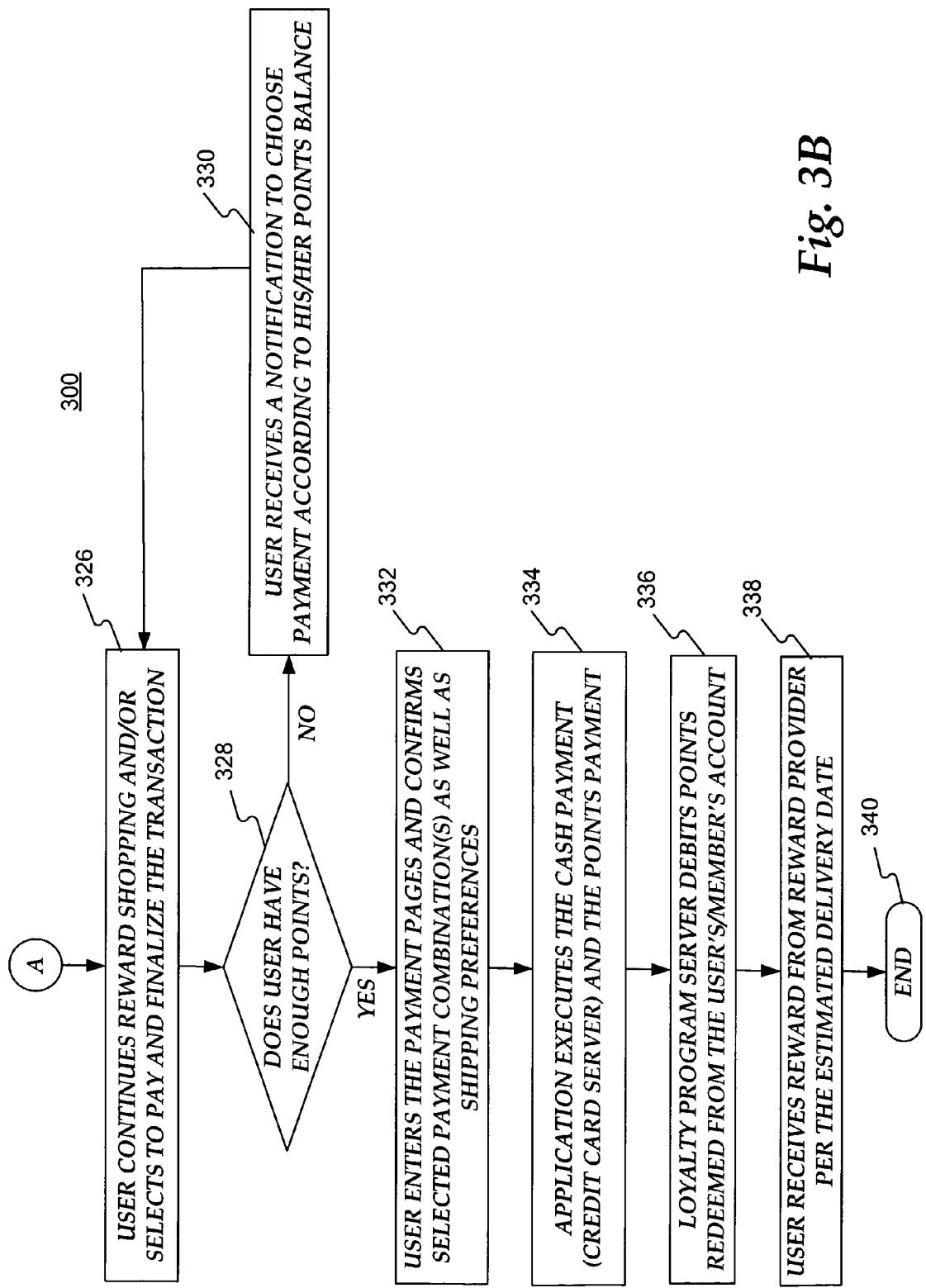

FIG. 3A and FIG. 3B is a flow chart setting forth the general stages involved in an exemplary method 300 consistent with the invention for a payment offer generator application using, for example, system 100 of FIG. 1A and FIG. 1B. In general, exemplary method 300 describes a shopping process to redeem non-monetary currency and/or cash in a program that may leverage a dynamic non-monetary currency value generation process. Exemplary ways to implement the stages of exemplary method 300 will be described in greater detail below. Exemplary method 300 may begin at starting block 302. Consistent with exemplary method 300, user 105 may wish to redeem non-monetary currency and may enter POGA 180 with his/her login and password (stage 304.) For example, user 105 may enter POGA 180 directly or via one of the reward program servers 150. Login information may either be passed to POGA 180 via at least one of reward program servers 150 or entered by user 105 through user interface 190. The login information may be validated by POGA 180 to ensure, for example, user 105 is a particular reward program member.

Next, POGA 180 may determine if a user account exists associated with user 105 (stage 306.) For example, if POGA 180 determines that the user account does not exist, user 105 may access one of reward program server 150 (stage 308.) In other words, non-reward program members may be referred to, for example, a reward program member sign-up page. For example, user 105 may select a program enrollment option (stage 310) and perform an enrollment process (stage 312.) One of reward program servers 150 may store user data in one of member databases 152 (stage 314.) The one of reward program servers 150 accessed by user 105 may provide user account details (e.g., login and password) (stage 316.)

Next, POGA 180 may display a personalized welcome page to user 105 on user interface 190 including the non-monetary currency balance for user 105 and some personal details (e.g., name, address, etc) (stage 318.) For example, upon login, a personalized welcome page may be displayed including up-to-date non-monetary currency balance for user 105 and may entail other relevant data (e.g., name, address, elite level, etc.). The personalized welcome page may also contain a selected "dream reward" or other personalized features and services based on user 105's preferences and/or past selections. Reward search functions may be available and may comprise reward categories, channels, brands, shops, prices, non-monetary currency, article names or numbers, or other parameters.

After the personalized welcome page is displayed, user 105 may browse through rewards and select preferred reward (stage 320.) Moreover, POGA 180 may communicate a new or selective reward set as well as promotions that may be based on user/member data. As a result, the selective rewards set may be targeted to go to all or only a selected group of members (e.g., only the ones living in a possible shipping country of a reward, etc.).

Next, POGA 180 may display to user 105 payment options (non-monetary currency, cash, or any combination thereof) (see Table 2 below) based on the reward program's dynamic currency value algorithm (see Table 1.) POGA 180 may also display to user 105 reference graphs described in greater detail below (see FIG. 4 and FIG. 5) (stage 322.)

Table 1 shows parameters/input values included in an exemplary dynamic non-monetary currency value algorithm ("the algorithm") used to produce the plurality of payment pairs shown in Table 2 below.

TABLE 1

| Algorithm Parameters/Input Values | | Value | Comment |
|---|---|---|---|
| Currency value | c | | |
| Non-currency value | p | | For example: points, miles |
| Retail price | r | 100 | |
| Wholesale price | w | 50 | |
| Any kind of fees | f | 3.00% | Typically below 100% |
| Margins | m | 10.00% | Typically below 100% |
| Coverage price | s | 56.500 | s = w + w * (f + m) |
| Points redemption value | v | 0.001 | |
| Points shopping value growth: | | | |
| Below coverage price | b | 0.10% | Typically below 100% |
| Above coverage price | a | 5.00% | Typically below 100% |

As shown in Table 1, retail and wholesale prices may comprise the retail and wholesales prices of any products or services previously selected by user 105. Fees may be based on the wholesale price, for example. Dynamic fees can be based on the retail price, on the cash payment, or on other factors (e.g., credit card fees, etc.). Furthermore, fees can be flexible and based on service options (e.g., based on shipping options, etc.) or fixed (e.g., internal administration fees, etc.). Depending on the nature of the fees, the algorithm may be different than described in this illustrative example. Margins may comprise desired minimum corporate margins. The non-monetary currency redemption value may comprise the price a reward program is willing to pay for redeeming its non-monetary currency (e.g., points or miles.) Non-monetary currency shopping value growth may define the slope with which the non-monetary currency shopping value for the member grows per additional monetary currency paid. Different growth rates (+ or −) can be applied for any segment on the overall pricing curve.

The following describes the dynamic currency value algorithm, as referred to above, in more detail. As described below, P algorithm may describe a formula for calculating non-monetary currency required based on a selected share of cash a user 105 may intend to pay. C algorithm (derived from P algorithm), may describe a formula for calculating cash required based on the non-monetary currency a user 105 may intend to redeem for a selected reward. The following two algorithms (C and P) are exemplary and can be calculated based on an unlimited number of parameters and an unlimited number of +/− growth rates for each and every parameter. Positive point values are possible, where the user accrues non-monetary currency for a purchase (e.g., when a user pays 100% of the retail price in cash and collects 2 points/$ spent).

If $c <= s$:

P Algorithm:

$$p = \frac{(r-c)w(1+f+m)}{rv(1+b)^c}$$

C Algorithm:

(P Algorithm solved for c):

$$c = \frac{\beta}{\gamma} - \frac{\text{Product Log}\left[\frac{\alpha^{\frac{\beta}{\gamma}}\log(\alpha)}{\gamma}\right]}{\log(\alpha)}$$

or $$\alpha = (1+b)$$

$$\alpha^c = \beta - \gamma c \text{ where } \beta = \frac{w(1+f+m)}{vp}$$

$$\gamma = \frac{w(1+f+m)}{rvp}$$

IF $c > s$:

P Algorithm:

$$p = \frac{(r-c)w(1+f+m)}{rv(1+b)^c(1+a)^{(c-s)}}$$

C Algorithm:

(P Algorithm solved for c):

$$c = \frac{\beta}{\gamma} - \frac{\text{Product Log}\left[\frac{\alpha^{\frac{\beta}{\gamma}}\log(\alpha)}{\gamma}\right]}{\log(\alpha)}$$

or $$\alpha = (1+a)(1+b)$$

$$\alpha^c = \beta - \gamma c \text{ where } \beta = \frac{w(1+f+m)(1+a)^s}{vp}$$

$$\gamma = \frac{w(1+f+m)(1+a)^s}{rvp}$$

Table 2 shows the member payment (i.e., a plurality of payment pairs, each of the plurality of payment pairs comprising a non-monetary currency component and a monetary currency component) as well as the non-monetary currency shopping value, which may comprise the value a member (e.g., user 105) gets for a unit of non-monetary currency (cash paid/non-monetary currency spent.)

TABLE 2

| Cash c | Points p | Points shopping value (r − c)/p | b or a |
|---|---|---|---|
| 0 | 56,500 | 0.00177 | |
| 1 | 55,879 | 0.00177 | 0.001 |
| 2 | 55,259 | 0.00177 | 0.001 |
| 3 | 54,641 | 0.00178 | 0.001 |
| 4 | 54,024 | 0.00178 | 0.001 |
| 5 | 53,407 | 0.00178 | 0.001 |
| 6 | 52,792 | 0.00178 | 0.001 |
| 7 | 52,179 | 0.00178 | 0.001 |
| 8 | 51,566 | 0.00178 | 0.001 |
| 9 | 50,955 | 0.00179 | 0.001 |
| 10 | 50,344 | 0.00179 | 0.001 |
| . | . | . | . |
| . | . | . | . |
| . | . | . | . |
| 90 | 1,042 | 0.00960 | 0.050 |
| 91 | 893 | 0.01008 | 0.050 |
| 92 | 756 | 0.01059 | 0.050 |
| 93 | 630 | 0.01111 | 0.050 |
| 94 | 514 | 0.01167 | 0.050 |
| 95 | 408 | 0.01225 | 0.050 |
| 96 | 311 | 0.01287 | 0.050 |
| 97 | 222 | 0.01351 | 0.050 |
| 98 | 141 | 0.01419 | 0.050 |
| 99 | 67 | 0.01489 | 0.050 |
| 100 | 0 | — | — |

Figure 4:
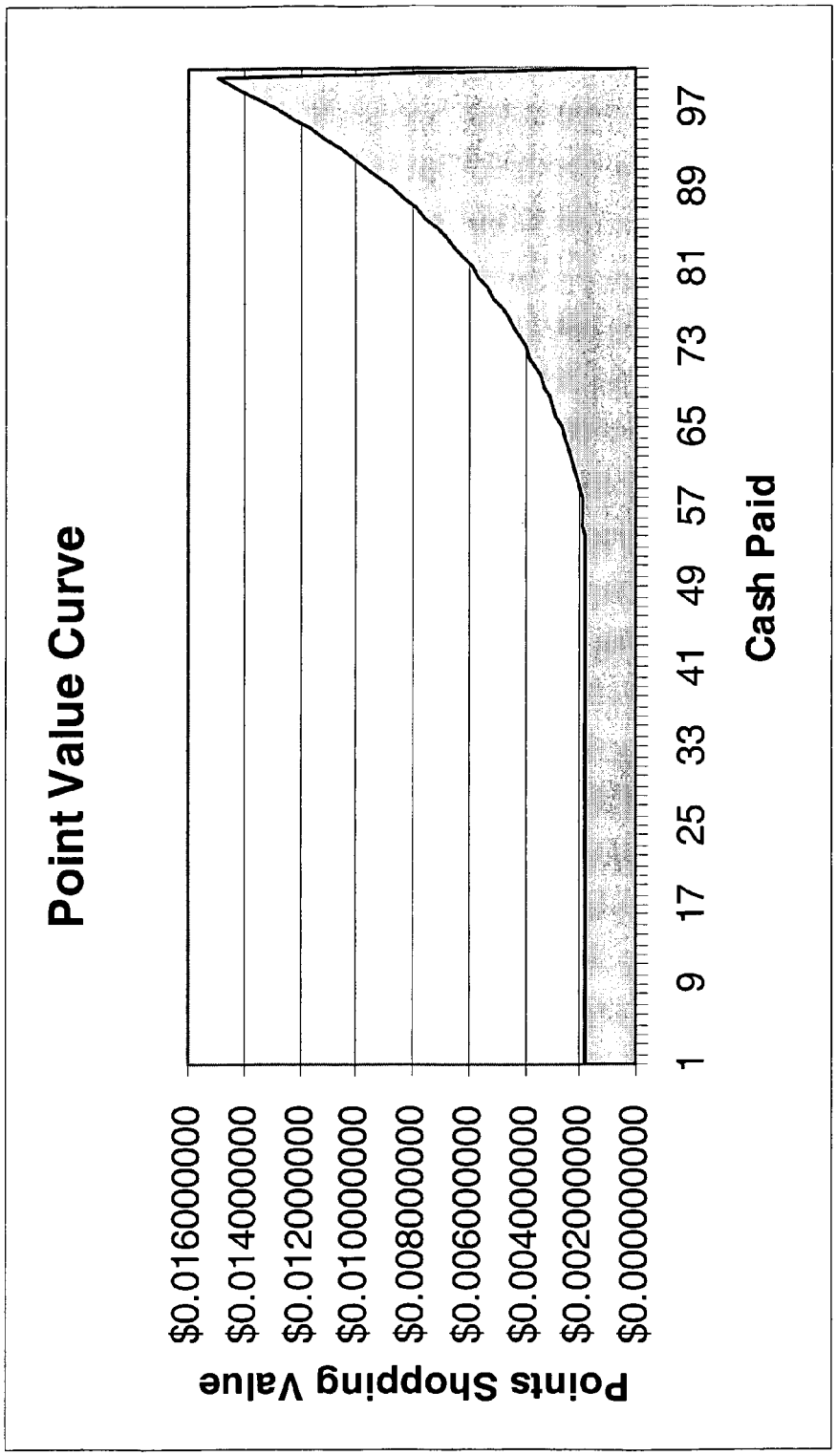
FIG. 4 is an exemplary non-monetary reward currency value requirements curve showing the dynamic value of non-monetary reward currency that depends on the amount of cash added to the non-monetary reward currency in total payment for a reward consistent with an embodiment of the present invention.

FIG. 4 shows a "non-monetary currency value curve" that may be displayed to user 105 and may indicate the change of the "non-monetary currency shopping value" for user 105. The higher his/her share of cash is in the payment combination, the higher the value of each unit of non-monetary currency may be. As shown in FIG. 4, non-monetary currency value growth, for example, may be 0.1% before achieving the coverage price and may change to 5% after the coverage price for the product is reached. The change in value for user 105 may be important. In the current example, the "non-monetary currency shopping value" starts at $0.00177 (when $1 is paid in cash) and ends at $0.01489 (when $99 is paid in cash) which corresponds to a value increase for the user over 740% (all at the same price per point for the underlying reward program.)

Figure 5:
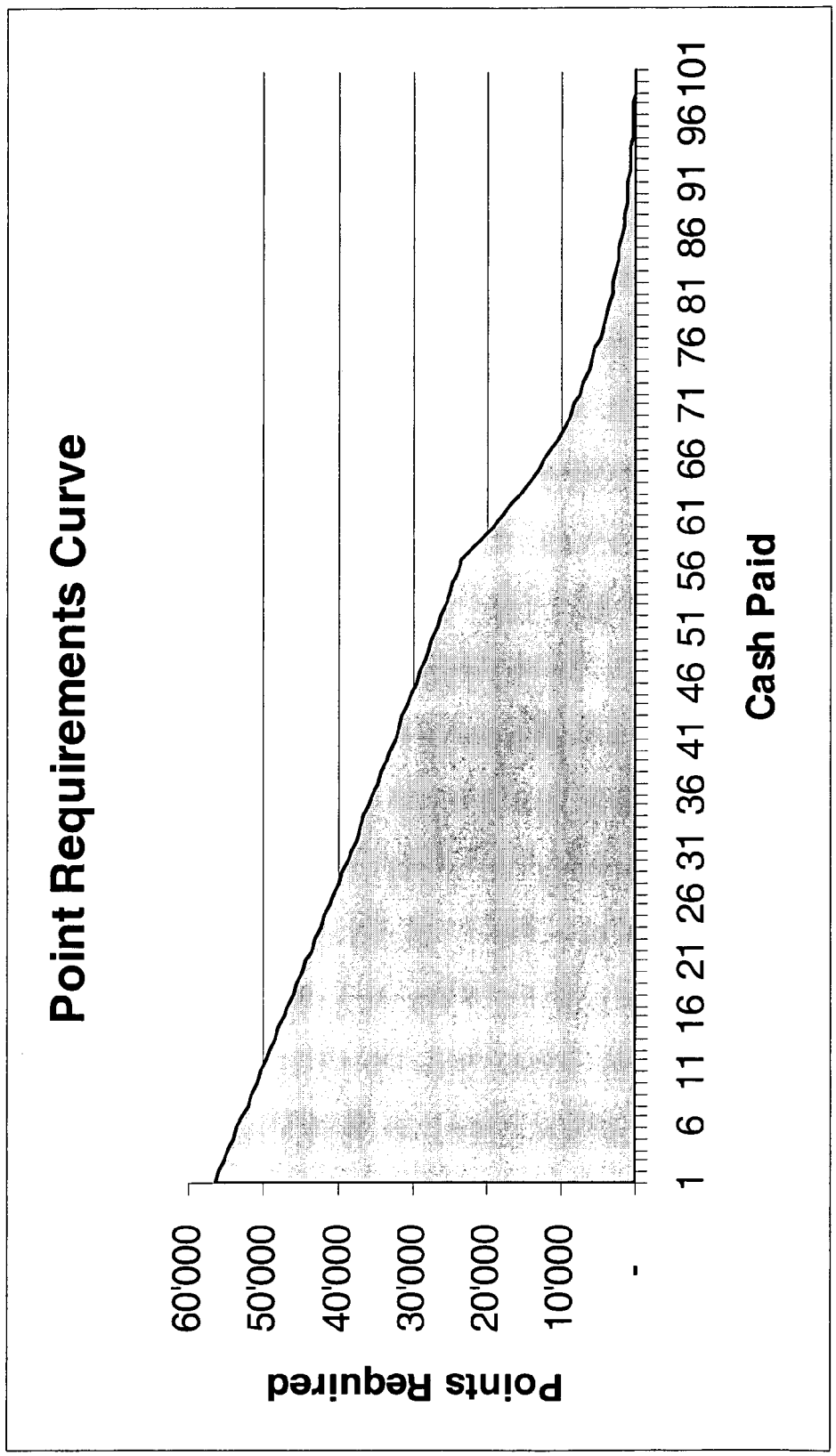
FIG. 5 is an exemplary non-monetary reward currency requirements curve showing the plurality of possible payment pairs comprised of a non-monetary currency component and a monetary currency component along a continuum of possible combinations, consistent with an embodiment of the present invention.

FIG. 5 shows a "non-monetary currency requirements curve" that may indicate the non-monetary currency required to pay for the selected product or service based on the amount of monetary currency (e.g., cash) paid. Again, non-monetary currency required may drop at a higher rate after the coverage price is reached (analogous to explanation for FIG. 4.)

Once POGA 180 displays payment options, user 105 may enter his/her selection into the reward shop shopping basket (stage 324.) For example, the shopping basket may display a payment pair chosen by user 105. Depending on the application, it may be possible to change the payment pair on one item only or for the entire basket (change the payment pair of all rewards in the basket). User 105 may continue reward shopping and/or selects to pay and finalize the transaction (stage 326.)

Next, POGA 180 may determine if user 105 has enough non-monetary currency (stage 328). For example, before entering the payment page, a "non-monetary currency check" may be performed to ensure the required non-monetary currency to complete the transaction is available to user 105. A credit card check with credit card server 116 may be performed upon processing the basket payment. If POGA 180 determines user 105 does not have enough non-monetary currency, user 105 may receive a notification to choose payment according to his/her non-monetary currency balance (stage 330.)

In order to complete the transaction, user 105 may enter the payment pages and confirm selected payment pair(s) as well as shipping preferences (stage 332). Then POGA 180 may execute the cash payment (credit card server 116) and the non-monetary currency payment (stage 334). Next, one of reward program servers 150 may debit non-monetary currency redeemed from user 105's account (stage 336). User may consequently receive the reward from the reward provider per the estimated delivery date (stage 338). Exemplary method 300 may then end (stage 340).

The dynamic nature of the value of a unit of non-monetary currency generated in the present invention adds additional value to reward programs and the associated non-monetary currency utilized. By making the non-monetary currency for items to be redeemed dynamic, a loyalty/reward program facilitator can make the reward program more attractive by offering additional rewards beyond what is typically offered and what the non-monetary currency generally may be used for. For example an airline may be able to more effectively offer additional rewards beyond flights that may be purchased with frequent flyer miles. The dynamic nature of the non-monetary currency utilized in the present invention increases the likelihood that airline reward program members will utilize frequent flyer miles currency for items other than flights.

For example, a member may redeem 20,000 miles for a flight having a value of about $400. The cost to the airline for the flight is $50.00. Accordingly, if the airline offers another product or service as a reward to redeem an equivalent number of miles, the airline only has $50.00 to spend. If the airline offers a $50.00 flower arrangement as an alternative to the flight, in most cases, the member of the loyalty program will redeem miles for the flight because the flight has a value of $400.00, in comparison with the $50 retail value for the flower arrangement. Dynamic pricing allows the loyalty program facilitator to increase the value of each unit of the non-monetary currency on a sliding scale up to a point where use of the non-monetary currency has a value close to and in some instances greater than the value of the non-monetary currency when it is used for flights.

In the flower arrangement example, the flower arrangement may actually cost the program facilitator $35.00. If the non-monetary currency holder is willing to spend $35.00 or close to that amount, the program facilitator can afford to give the non-monetary currency holder more value for each unit of non-monetary currency. If the non-monetary currency holder spends $35.00 the program facilitator may ask as little as 500 miles from the user to purchase the flower arrangement, the 500 miles spent on the flower arrangement have a greater value per mile ($0.03), as compared to the value of a mile for an airline flight ($0.02). 20,000 miles for an airline flight that normally costs $400.00 translates that each mile has a value of $0.02. In this situation the member does a calculation on the flower arrangement and determines that paying $35.00 plus 500 miles for a flower arrangement having a $50.00 value means that each mile spent in paying for the flower arrangement has a higher value. This is also viewed in the context of the flower arrangement having been purchased with 20,000 points and $0.00. In this scenario the value of each mile is $0.0025 per mile. Not very many non-monetary currency holders would choose to spend non-monetary currency in this payment pair configuration because the value of each unit of non-monetary currency is too low.

Offering dynamic pay which includes a combination of monetary and non-monetary currency allows a reward/loyalty program to offer varying items other than traditional reward items associated with the program. The solution provided by the present invention helps to generate more value for the holder of the non-monetary currency because if the program member buys the flower bouquet using dynamic non-monetary currency and the dynamic payment method of the present invention, the program member can purchase the flower bouquet partially with monetary currency, thereby causing each unit of the non-monetary currency to increase in value. Accordingly, the counter value of the non-monetary currency maybe more than the value of the frequent flyer miles if they are used towards a flight.

Offering program members the option to purchase goods or services with dynamic non-monetary currency insures that every customer that wants to buy items other than free flights will, somewhere on the pricing scale find a combination of cash and miles which is equivalent to or greater than the value of the miles if the member had redeemed the miles for a free flight.

Another example illustrating the dynamic nature of non-monetary currency generated in the present invention shall be illustrated in the context of airline frequent flyer miles reward program member redeeming non-monetary currency (miles) for a CD player. The CD player has a $100 retail value and a wholesale value of $50. The award program facilitator buys the CD player for $50. The airline frequent flyer program member may purchase the CD player with a payment pair comprised of a monetary currency component of $0.00 and a non-monetary currency component of 20,000 miles. In this example the purchaser is more likely to exchange the 20,000 miles for an airline ticket because the airline ticket has a retail value of $400 in comparison to the CD player, which has a retail value of $100. In this example the counter value of the miles when investing them in a CD player is 25% of an airline ticket. The dynamic non-monetary currency component of the present invention allows the reward program member to purchase the CD player using a combination of non-monetary and monetary currency in which the unit value of each mile shall be equal to or greater than when used to purchase the CD player in comparison to being used for the purchase of an airline flight.

The CD player was purchased for $50. If the reward program member chooses the option to purchase the CD player using a combination of $75 cash and 1,000 miles, the present invention allows the system to provide the purchaser of the CD player with a substantially increased value for each unit of non-monetary currency (miles). Because the reward program member paid $75 cash, the cost of the CD player to the airline has already been covered and also includes a profit margin of $25. The remaining $25 necessary to reach the retail price can be purchased with 1,000 miles, making the counter value of miles in this example greater than the counter value of each mile used in the purchase of an airline ticket. In this example it can be seen that the dynamic non-monetary currency also has the added advantage of providing a reward program in which the reward program sponsor may allow redemption of non-monetary currency for a cost of $0 to the program sponsor or, in other examples the cost is less than the cost associated with the purchase of an airline ticket.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A computer implemented method for determining payment values for currency components of at least one payment pair comprising a non-monetary currency component and a monetary currency component, wherein the payment pair is used in the purchase of goods and services, the method comprising: retrieval, by a computing device, data representative of at least one attribute associated with the goods and services being purchased; and the computing device generating, based upon the attributes retrieved, data representative of values for the currency components of the at least one payment pair, wherein a unit value of the units comprising the non-monetary currency component is dynamic, varying along a payment continuum in response to processing of data representative of the at least one attribute associated with the goods or services being purchased and data representative of the amount of the monetary currency component of the payment pair.

2. The computer implemented method of claim 1, wherein the data representative of at least one attribute associated with the goods and services being purchased includes data representative of at least one of a retail price value, a wholesale price value, a fee value, a margin value, a coverage price value, a non-monetary currency redemption value, a non-monetary currency shopping value growth below coverage price value, and a non-monetary currency shopping value growth above coverage price value.

3. The computer implemented method of claim 1, wherein the price continuum extends from zero up to the price of the goods or services being purchased.

4. The computer implemented method of claim 1, wherein generating values for the currency components of the at least one payment pair further comprises, determining the monetary currency component based upon the input of data representative of the number of units of the corresponding non-monetary currency component of the payment pair, an initial dynamic unit value associated with each unit of the non-monetary currency component, and the at least one attribute associated with the goods and services being purchased.

5. The computer implemented method of claim 1, wherein generating values for the currency components of the at least one payment pair further comprises, generating the non-monetary currency component value based upon the input of data representative of the at least one attribute associated with the goods and services being purchased including data representative of a value of the monetary currency component of the payment pair, wherein the unit value of the units of non-monetary currency comprising the non-monetary currency component is dynamic and varies along a currency continuum associated with the goods and services being purchased and is not proportional to the value of the corresponding monetary currency component within the payment pair.

6. The computer implemented method of claim 1, wherein generating values for the currency components of the at least one payment pair further comprises, generating the monetary currency component based upon data representative of the at least one attribute input relating to the purchase of goods and services and a value of the non-monetary currency component, wherein the monetary currency component value has a corresponding value that is different for each payment pair of a plurality of payment pairs generated.

7. The computer implemented method of claim 1, further comprising displaying the at least one payment pair.

8. The computer implemented method of claim 1, further comprising debiting a monetary currency account based on the monetary currency component value corresponding to a payment pair generated and selected by a consumer, and debiting a non-monetary currency account based on the number of units of non-monetary currency comprising the non-monetary currency component corresponding to the payment pair generated and selected by the consumer.

9. The computer implemented method of claim 8, wherein the debiting a the monetary account and the non-monetary currency account occurs at the time of the purchase of the goods and services.

10. A system for determining the value of at least one currency component of a payment pair used to purchase goods or services, wherein the payment pair is comprised of data representative of a non-monetary currency component and a monetary currency component, the system comprising: a memory storage for maintaining a database; and a processing unit coupled to the memory storage, wherein the processing unit is configured to receive an input of data including data representative of a first component of the payment pair and at least one attribute relating to the goods or services purchased, said processing unit being further configured to generate, based upon the received input, data representative of a second component of the at least one payment pair, wherein the respective value of the second component of the payment pair is not directly proportional to the first component of the payment pair, and wherein a unit value of the units comprising the non-monetary currency component is dynamic, varying along a payment continuum in response to processing of data representative of the at least one attribute associated with the goods or services being purchased and data representative of the amount of the monetary currency component of the payment pair.

11. The system of claim 10, wherein the processing unit being configured to receive the input further comprises the processing unit being configured to receive data and in response thereto generate the at least one payment pair, wherein the data representative of the at least one attribute includes at least one of a retail price value, a wholesale price value, a fee value, a margin value, a coverage price value, a non-monetary currency redemption value, a non-monetary shopping value growth below coverage price value, and a non-monetary shopping value growth above coverage price value or any variation or extension thereof.

12. A system for determining the value of at least one currency component of a payment pair used to purchase goods or services, wherein the payment pair is comprised of data representative of a non-monetary currency component and a monetary currency component, the system comprising: a memory storage for maintaining a database; and a processing unit coupled to the memory storage, wherein the processing unit is configured to receive an input of data including data representative of a first component of the payment pair and at least one attribute relating to the goods or services purchased; and generate, based upon the received input, data representative of a second component of the at least one payment pair, wherein the respective value of the second component of the payment pair is not directly proportional to the first component of the payment pair, wherein the processing unit being configured to generate at least one payment pair is further configured to calculate the non-monetary currency value based upon the following equation:

$$p = \frac{(r-c)w(1+f+m)}{rv(1+b)^c};$$

where p=the non-monetary currency value, r=a retail price, w=a wholesale price, f=a fee, m=a margin, s=a coverage price, v=a non-monetary currency redemption value, b=a non-monetary currency shopping value growth below coverage price value, and a=a non-monetary currency shopping value growth above coverage price value.

13. The system of claim 10, further comprising the processing unit being configured to display the at least one payment pair.

14. The system of claim 10, further comprising the processing unit being configured to receive an indication corresponding to one of the at least one payment pair.

15. The system of claim 10, further comprising the processing unit being configured to debit a monetary currency account based on the monetary currency component value corresponding to the at least one payment pair selected from a plurality of payment pairs generated.

16. The system of claim 10, further comprising the processing unit being configured to debit a non-monetary currency account based on the number of units of the non-monetary currency comprising the non-monetary currency component corresponding to the payment pair selected from the at least one payment pair.

17. A computer-readable medium which stores a set of instructions which when executed performs a method for determining values for currency components of at least one payment pair comprising a non-monetary currency component and a monetary currency component, wherein the payment pair is used in the purchase of goods and services, the method executed by the set of instructions comprising:
retrieving data representative of at least one attribute associated with the goods and services being purchased and receiving data representative of at least one of the non-monetary currency component and the monetary currency component; and
generating at least one set of currency components of the payment pair, based upon the received input and the data representative of the at least one attribute, wherein a unit value of the units comprising the non-monetary currency component is dynamic, varying along a price continuum in response to processing of data representative of the at least one attribute associated with the goods or services being purchased and data representative of the amount of the monetary currency component of the payment pair.

18. The computer-readable medium of claim 17, wherein receiving the input further comprises receiving at least one price attribute of data representative of at least one of a retail price value, a wholesale price value, a fee value, a margin value, a coverage price value, a non-monetary currency redemption value, a non-monetary currency shopping value growth below coverage price value, and a non-monetary currency shopping value growth above coverage price value.

19. The computer-readable medium of claim 17, wherein the price continuum extends from zero up to the price of the goods or services being purchased.

20. The computer-readable medium of claim 17, wherein the method of determining values for the currency components of the at least one payment pair further comprises, determining the monetary currency component value based upon the number of units of non-monetary currency comprising the non-monetary currency component of a payment pair, an initial dynamic unit value associated with each unit of the non-monetary currency comprising the non-monetary currency component, and the at least one attribute of data received that relates to the goods or services being purchased.

21. The computer-readable medium of claim 17, further comprising displaying the at least one set of payment pair values.

22. The computer-readable medium of claim 17, further comprising receiving an indication corresponding to the at least one set of payment pair values.

23. The computer-readable medium of claim 22, further comprising debiting a monetary currency account based on the monetary currency component value corresponding to the at least one set of payment pair values selected from a plurality of payment pairs.

24. The computer-readable medium of claim 22, further comprising debiting a non-monetary currency account based on the non-monetary currency component value corresponding to the at least one set of payment pair values selected from a plurality of payment pairs.

25. A method for determining values for currency components of at least one payment pair which when combined provide a dynamic currency, the payment pair comprising a non-monetary currency component and a monetary currency component that is used in a purchase of goods and services, the method comprising:

a computing device receiving an input of data, wherein the data received is representative of at least one attribute associated with the purchase of goods and services; and the computing device generating, based upon the input received, data representative of values of the at least one payment pair, wherein the non-monetary currency component generated is dependent upon a non-monetary currency unit value generated, wherein the unit value generated is dynamic, varying along a monetary price continuum ranging from zero up to the price of the goods and services being purchased, the dynamic unit value generated being dependent upon an input of data representative of the monetary currency component of the payment pair.

26. A method for determining payment values for currency components of at least one payment pair comprising a non-monetary currency component and a monetary currency component, wherein the payment pair is used in the purchase of goods and services, the method comprising: receiving an input of data from a first computing device, wherein the data received includes data representative of at least one attribute associated with the goods and services being purchased; and generating by a second computing device, based upon the received input, data representative of values for the currency components of the at least one payment pair, wherein a unit value of the units comprising the non-monetary currency is dynamic and varies in response to data received from the first computing device, wherein generating values for the currency components of the at least one payment pair further comprises, calculating the non-monetary currency component value based upon the following equation:

$$p = \frac{(r-c)w(1+f+m)}{rv(1+b)^c};$$

where p=the non-monetary currency value, r=a retail price, w=a wholesale price, f=a fee, m=a margin, s=a coverage price, v=a points redemption value, b=a points shopping value growth below coverage price value, and a=a points shopping value growth above coverage price value.

27. A computer-readable medium which stores a set of instructions which when executed performs a method for determining values for currency components of at least one payment pair comprising a non-monetary currency component and a monetary currency component, wherein the payment pair is used in the purchase of goods and services, the method executed by the set of instructions comprising:

receiving an input of data from a computing device wherein the data received includes data representative of at least one attribute associated with the goods and services being purchased and data representative of at least one of the non-monetary currency component and the monetary currency component; and generating at least one set of currency components of the payment pair, based upon the received input, wherein a unit value of the units comprising the non-monetary currency component is determined and said unit value varies in response to said data received from the computing device, wherein generating the at least one set of payment pair values further comprises, calculating the non-monetary component value based upon the following equation:

$$p = \frac{(r-c)w(1+f+m)}{rv(1+b)^c};$$

where p=the non-monetary currency value, r=a retail price, w=a wholesale price, f=a fee, m=a margin, s=a coverage price, v=a non-monetary currency redemption value, b=a non-monetary currency shopping value growth below coverage price value, and a=a non-monetary currency shopping value growth above coverage price value.

* * * * *